Oct. 6, 1959     M. W. BANOWETZ, SR     2,907,136
ANT TRAP
Filed June 4, 1957
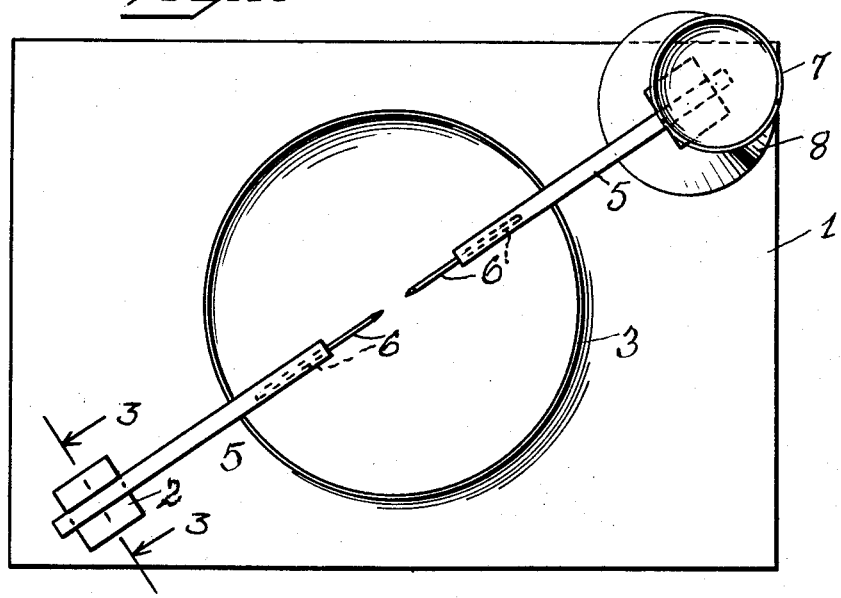
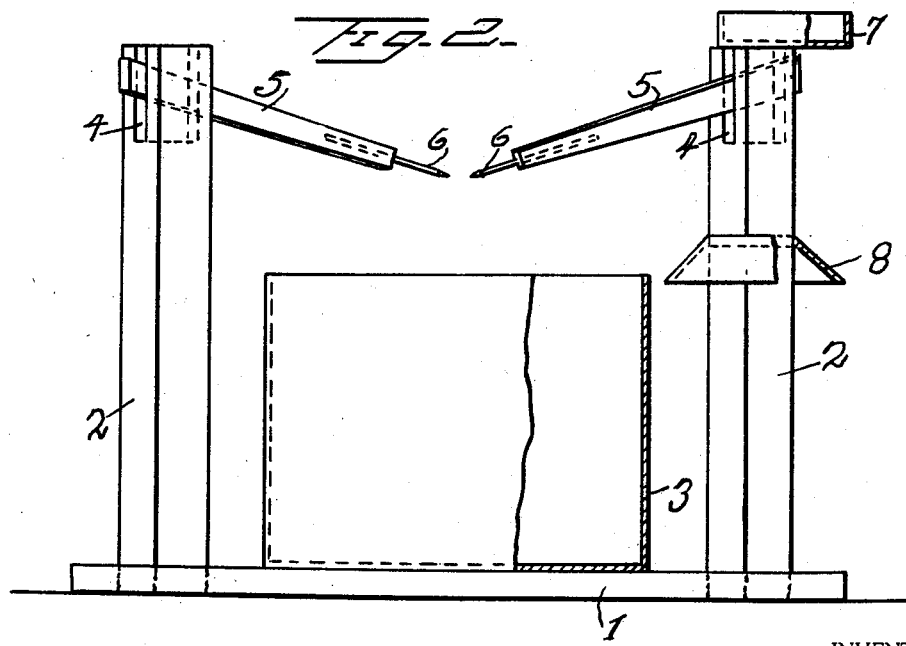
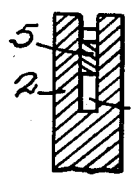
INVENTOR
*M.W. Banowetz, Sr.*
BY *E.E. Vrooman & Co.*
ATTORNEYS

2,907,136
ANT TRAP

Michael W. Banowetz, Sr., New Orleans, La., assignor, by direct and mesne assignments, to Southern Ant Trap Co., Inc., a corporation of Louisiana Application June 4, 1957, Serial No. 663,388

1 Claim. (Cl. 43—121)

This invention relates to an ant trap.

An object of the invention is the provision of novel means for providing an efficient trap that can be adapted for destroying different size ants by drowning them.

Another object of the invention is the provision of adjustable means in an ant trap for adapting the trap to destroy ants of different sizes.

A further object of the invention is the construction of a comparatively simple ant trap in which there are bodily adjustable arms with needle-like inner ends positioned over a vessel which will receive the ants falling from said needle-like ends of the arms.

With the foregoing and other objects in view, this invention comprises certain novel constructions, combinations and arrangements of parts as will be hereinafter fully described, illustrated in the accompanying drawings, and more particularly pointed out in the appended claim.

In the drawings:

Figure 1 is a top plan view of an ant trap constructed in accordance with the present invention.

Figure 2 is a view partly in section and partly in side elevation of the ant trap.

Figure 3 is a sectional view taken on line 3—3, Figure 1, and looking in the direction of the arrows.

Referring to the drawings by numerals, 1 designates the base of the ant trap and 2 the two vertical rigid posts on the base 1. Positioned between the wooden posts 2 and resting on base 1 is a glass jar or ant-receiving vessel 3.

Formed in the upper end of each post 2 is a slot 4. In each slot 4 is a bodily adjustable arm 5, which arms are frictionally mounted and can be slid back and forth in the slots to secure the desired position of the arms for the purpose hereinafter described.

Extending from the inner ends of bodily adjustable arms 5 are needles 6. The operator can bodily adjust the arms 5, within the slots 4, to accommodate the trap to different size ants, the needles 6 being always positioned approximately over the center of the jar 3 so that ants falling from the needles will be drowned in the jar 3, since it is intended to have said jar contain suitable liquid for the purpose of drowning or destroying the ants, falling from the needles.

The food box 7 is preferably positioned on the top of one of the posts 2. On the same post with the food box 7 is also mounted a shield 8, which shield is intended to turn back or prevent any ants crawling up the post from progressing further than the shield.

The frictional engagement of the bodily adjustable arms in the slot 4 is sufficient to hold the arms in the adjusted position which the operator finds most advantageous, when adjusting the arms upon the posts to trap different size ants or cockroaches.

It is to be noted that the adjustment of arms 5 can be obtained to cause said arms to be at any angle upon the posts, whereby experience teaches best results can be obtained. In practice, the operator can determine the distance apart of the needles 6, whereby ants going in opposite direction and meeting on the needles cannot pass, and more than likely one or more will fall off the needle into the liquid in the jar 3 and be destroyed.

While I have described the preferred embodiment of this invention and illustrated the same in the accompanying drawings, certain minor changes or alterations may appear to one skilled in the art to which this invention relates and I, therefore, reserve the right to make such alterations or changes as shall fairly fall within the scope of the appended claim.

What I claim is:

In an ant trap, the combination with a base, of a pair of straight wooden posts extending vertically from said base, each post being slotted on its upper end, one of said posts provided with a shield intermediate its ends and with a food box on its upper end, frictionally-held arms in said slots, said arms provided on their inner ends with needles, and an ant-receiving vessel on said base between said posts.

References Cited in the file of this patent

UNITED STATES PATENTS

| | | |
|---|---|---|
| 1,054,188 | Ehmann | Feb. 25, 1913 |
| 2,168,339 | Himel | Aug. 8, 1939 |
| 2,545,772 | Fisher | Mar. 20, 1951 |
| 2,580,130 | Rowdon | Dec. 25, 1951 |